March 22, 1966 J. M. TYRNER 3,241,183
FILM EXTRUSION DIE
Filed Dec. 23, 1963 2 Sheets-Sheet 1

INVENTOR.
JOSEPH M. TYRNER
BY
Benjamin Sweedler
ATTORNEY

March 22, 1966  J. M. TYRNER  3,241,183
FILM EXTRUSION DIE
Filed Dec. 23, 1963  2 Sheets-Sheet 2
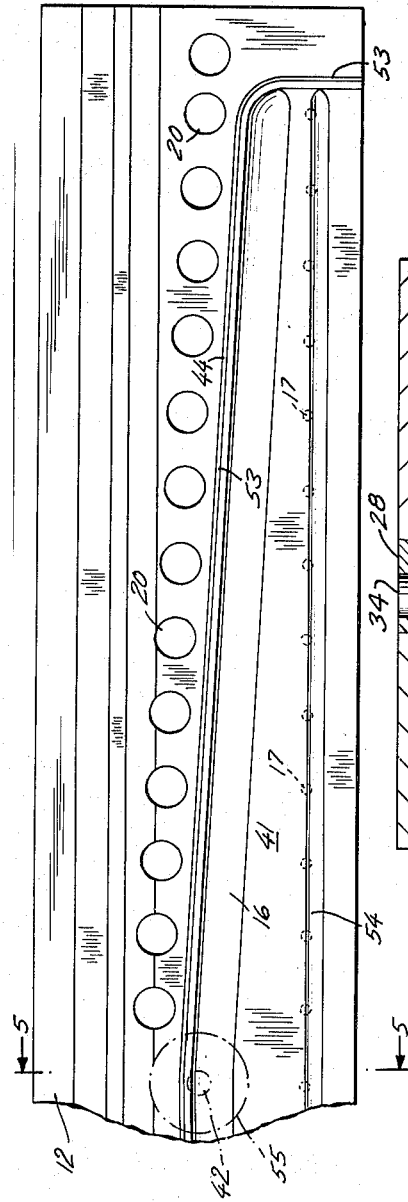
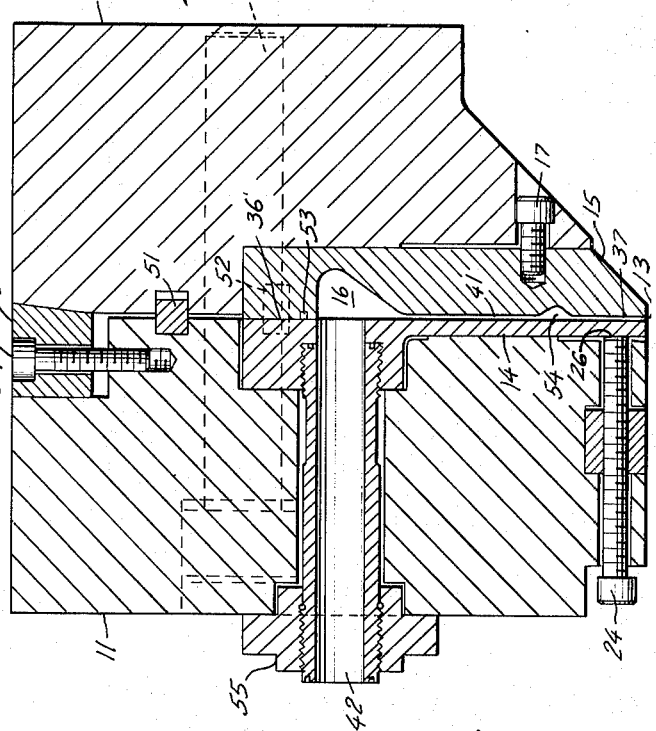
INVENTOR.
JOSEPH M. TYRNER
BY
Benjamin Sweedler
ATTORNEY

United States Patent Office 3,241,183
Patented Mar. 22, 1966

3,241,183
FILM EXTRUSION DIE
Joseph M. Tyrner, Brookside, N.J., assignor to Allied Chemical Corporation, New York, N.Y., a corporation of New York
Filed Dec. 23, 1963, Ser. No. 332,514
5 Claims. (Cl. 18—12)

This invention relates to dies for extrusion of plastic film.

Such dies for forming flat films in which the width of the longitudinally elongated slot or exit gap is adjusted by deforming members which bear on a flexible wall forming one lip of this exit gap, are known. Heretofore known dies are objectionable for a number of reasons, including among others:

(1) The exit gap is secured or restrained at its opposite ends by end pieces which prevent free expansion or contraction of the lips defining the exit gap. Since the ends of the exit gap are thus restrained and cannot expand freely upon increase in temperature, distortion of the exit gap takes place. The extent of distortion in use is indeed marked; for example in the case of an exit gap 50 inches long with differential expansion of the two lips defining the exit gap so that one lip expands two thousandths of one percent more than its mate, the distortion can be about 5/32 of an inch. Such distortion seriously affects the uniformity and quality of the flat films produced.

(2) Provisions for adjusting the exit gap in known dies are not entirely satisfactory. Different resins may require a different width of exit gap to obtain optimum draw down conditions. Existing dies are not designed to give the desired accurate and easy adjustment of the exit gap.

(3) Certain heretofore known dies have choke bars in the passageway through which the molten resin flows from the die cavity to the exit gap to introduce a variable resistance in the flow path to the exit gap to compensate for the contour of the flow path. The resin flowing out at the center and that flowing out at the ends travel different distances and the variable resistance along the length of the exit gap provided by the choke bar is intended to compensate for this. Different choke bars, each machined to compensate for this factor and to take into account the flow characteristics of the resin extruded from the die, are required. Choke bars, however, are objectionable not only because they complicate the construction of the die but also because they introduce ledges or obstructions in the flow path on which stagnant material can accumulate with consequent deleterious affect on the quality of the films produced. When resins are processed at a temperature at which they become thermally unstable in a period of time comparable to the residence time in the die the use of dies having choke bars has been found particularly objectionable.

(4) One and the same die, as heretofore constructed, cannot readily be adapted to produce different web widths requiring different die cavity conformations.

It is a principal object of the present invention to provide an extrusion die designed (a) to prevent differential expansion or contraction of the lips defining the exit gap, (b) to permit ready and accurate adjustment of the exit gap, (c) for adjustment to compensate for the particular flow characteristics of the resin to be extruded from the die and the flow path within the die, and this without a choke bar, and (d) for ready substitution of one die cavity for another so that different web widths requiring different die cavity conformations can be produced employing the same die body.

Other objects and advantages of this invention will be apparent from the following detailed description thereof, taken in connection with the accompanying drawings, in which is shown for purposes of exemplification preferred embodiments of this invention and in which:

FIGURE 4 is a fragmentary front elevational view of the die cavity insert (i.e., the portion of the die to the right of the plane of abutment of the two supporting blocks, viewing FIGURE 5) and its supporting block and shows approximately one-half the length thereof; and FIGURE 5 is a vertical section through the die taken in a plane indicated by 5—5 on FIGURE 4.

Figure 1:
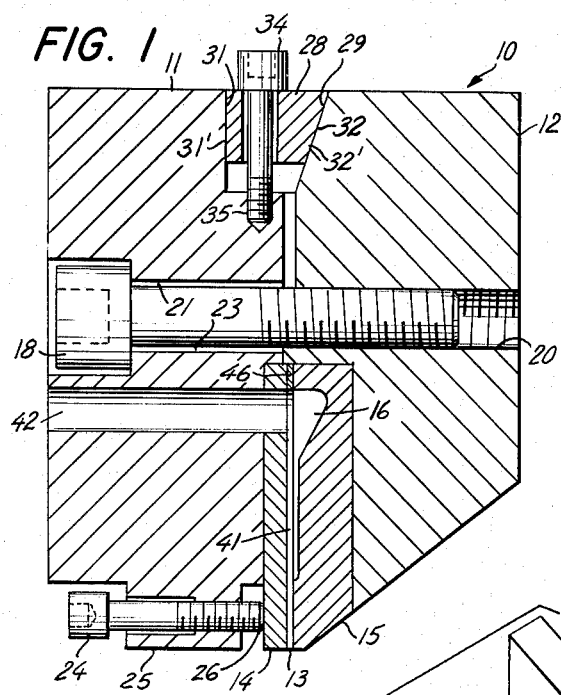
FIGURE 1 is a vertical section partly in elevation, through an extrusion die embodying this invention.
Figure 2:
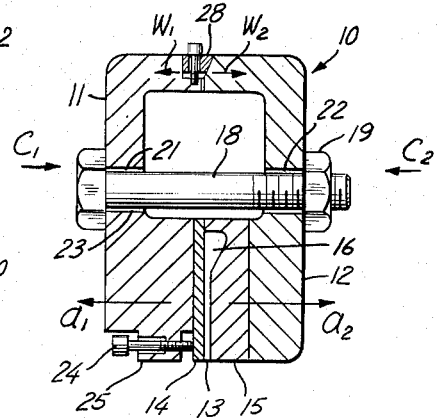
FIGURE 2 is a schematic representation of the direction of the forces generated by the adjustment wedge and clamping bolts in the extrusion die of FIGURE 1 and shows an alternative arrangement of clamping bolts.

For convenience in description the extrusion die will be described herein with the lower end shown in FIGURES 1, 2 and 5 as the lower end of the die, the opposite end, as the upper end and the dimension at right angles to the section in which FIGURES 1, 2 and 5 are taken as the length of the die. It will be understood, however, that the die can be positioned with the exit gap located to form a web film so that the end of the die containing the exit gap is positioned at the same level as the opposite end of the die. Hence the reference to lower, upper, etc. are used in a relative sense only and the invention is not to be limited to an extrusion die positioned as shown in the drawings.

Referring first to FIGURE 2, which shows schematically the clamping principle employed in the extrusion die 10 embodying this invention, the die comprises longitudinally elongated supporting blocks 11 and 12 each extending substantially the full length of the extrusion slot or exit gap 13. A flat flexible insert 14 defining one face of the flow path to the extrusion slot 13 is suitably removably mounted on supporting block 11 in the locality of the area of abutment of blocks 11 and 12 as shown in FIGURES 1, 2 and 5. Insert 14 can be held in place by removable screws or by making a close fit with its support or in any other desired manner. A die cavity insert 15 containing the die cavity 16 and defining the opposite face of the flow path leading from the die cavity 16 to the extrusion slot 13 is suitably removably mounted on the supporting block 12. For example, insert 15 can be held in place by screws 17 (FIGURE 5) positioned along the length of supporting block 12 and threaded into threaded openings in insert 15 and by the clamping bolts 18 which maintain the supporting blocks 11 and 12 in clamped engagement. The removable mounting for inserts 14 and 15 enables substitution of different inserts, with different die cavities, so that one and the same die can be used to produce different web widths.

In FIGURE 2 the spaced clamping bolts 18 are shown having clamping nuts 19 on the end thereof extending from supporting block 12. In FIGURES 1 and 5 the bolts 18 are threaded into openings 20 in the supporting block 12. In the FIGURE 2 modification the diameter of opening 21 in supporting block 11 and that of opening 22 in supporting block 12 are somewhat larger than the exterior diameter of the clamping bolts 18 to provide a clearance 23, the function of which will be described hereinafter. Clamping bolts 18 are positioned just above the die cavity 16 to insure maximum clamping action and hence a tight cavity, i.e., tight packed joints along the border edges of the die cavity and the edges of the flow path leading from the die cavity to the exit gap 13.

Spaced adjustment bolts 24 are positioned along the length of lower edge 25 of supporting block 11 having their ends 25 bearing on the flexible insert 14. The exit gap 13 can thus be shaped as desired to control the thickness of the outflowing resin for optimum film profile.

Positioned at the upper end 27 of the die is an adjustment wedge 28 extending substantially the full length of the die. Wedge 28 runs longitudinally, i.e., parallel to the length of the dye, and is positioned in opening 29 defined by a vertical wall 31 in supporting block 11 and inclined wall 32 in suporting block 12. These walls 31 and 32 cooperate with the walls 31' and 32', respectively, of the wedge 29 providing bearing surfaces through which the positioning of wedge 28 in opening 29 effects adjustment of the depth or thickness of flow path 41 from the die cavity 16 to the exit gap 13 and also adjustment of the width of the exit gap 13. Wedge 28 is held in place once adjusted and adjustment thereof effeced by screws 34, spaced along the length of the wedge and threaded into threaded openings 35 in supporting block 11.

Adjustment of position of wedge 28 in its opening 29 can be effected to change the thickness or depth of the flow path 41 as well as the width of the exit gap to give optimum flow for any given resin. This adjustment effects substantially the same adjustment as heretofore achieved by a restrictor or choke bar, yet it does not provide any obstruction to flow within flow path 41 and thus is free of the objections inherent in restrictor or choke bars. Moreover, the construction shown permits the adjustment to be effected more readily in view of the accessibility of the adjusting screws 34.

The direction of the forces acting on the die parts is indicated by the arrows in FIGURE 2. The arrows $w_1$, $w_2$ show the direction of the forces exerted by the adjustment wedge 28, which is to move the upper end of supporting blocks 11 and 12 away from each other. The arrows $c_1$ and $c_2$ show the direction of the forces exerted by the clamping bolts 18 and the cooperating nuts 19 (FIGURE 2) or threaded openings 20 (FIGURE 1). These forces act in a direction to maintain the supporting blocks tightly clamped together opposing the action of the adjustment wedge. The result of the wedge action is to force the flat insert 14 and the die cavity insert 15 apart as indicated by the arrows $a_1$ and $a_2$, the distance separating these members being controlled by the position of the adjustment wedge 28 within its opening 29. In the FIGURE 2 modification, the clearance 23 permits the desired adjustment to be effected by the adjustment wedge 28. In the structures of FIGURES 1 and 5 in which the clamping bolts 18 are threaded into opening 20 in supporting block 12, the clearance 23 enables the head portion of the bolt to move within supporting block 11; thus the position of the die cavity insert 15 can be changed relative to flat insert 14 to effect the desired adjustment.

Figure 3:
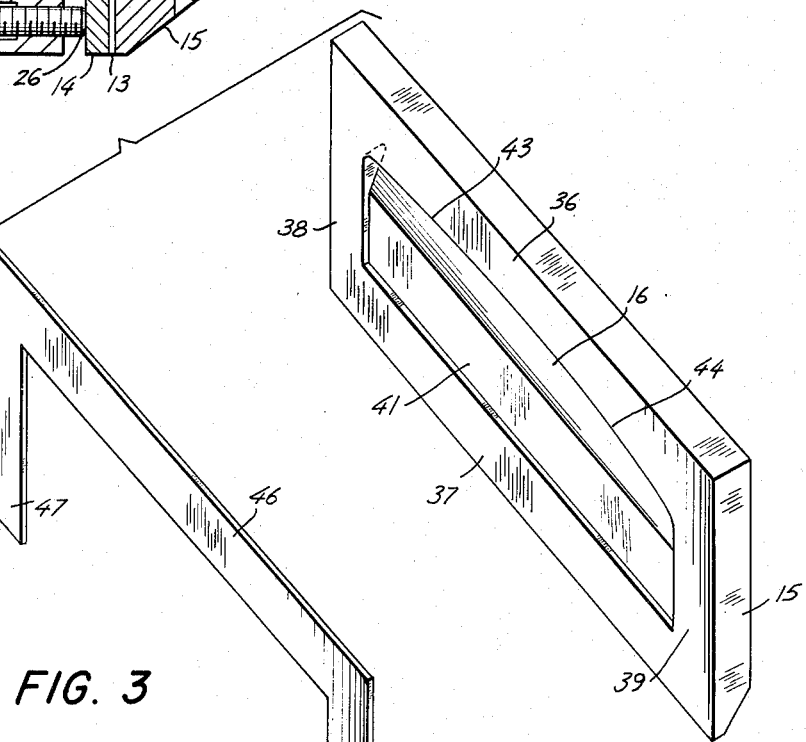
FIGURE 3 is a perspective elevational view of the replaceable die cavity insert and cooperating shim.

FIGURE 3 shows the die cavity insert 15 in perspective. This die cavity comprises a generally oblong member having an upper bearing surface 36, a lower land 37 defining one lip of the exit gap and relatively narrow side bearing surfaces 38 and 39, the inner edges of which define the ends of the die cavity 16 and the ends of flow path 41 leading downwardly therefrom. From the median portion of the die cavity 16, which median portion communicates with the resin feed line 42 (FIGURES 1 and 5) the die cavity 16 slopes downwardly as indicated at 43 and 44 towards its ends. The base of the die cavity 16 throughout its length communicates with the flow path 41 which leads into the exit gap 13.

In the modification of FIGURES 1 and 3 a removable shim 45 is clamped between the flexible insert 14 and the die cavity insert 15. Shim 45 is shaped as shown in FIGURE 3 with a longitudinally extending bar 46 positioned directly opposite the upper bearing surface 36 just above the die cavity 16 and the downwardly extending leg portions 47 and 48 directly opposite the side bearing surfaces 38 and 39 of the die cavity insert 15. Preferably the downwardly exetnding leg portions 47 and 48 are dimensioned so that they are substantially the same in width as the bearing surfaces 38 and 39 and have their lower edges coincident with the lower edge of the die cavity insert 15. The outer side edges of the leg portions 47 and 48 are coincident with the outer side edges of the flexible insert 14 and those of the die cavity insert 15 and the inner edges of the leg portions 47 and 48 either register with the inner edges of the bearing surfaces 38 and 39 defining the ends of the flow path 41 or are spaced therefrom so that the inner edges of the leg portions 47 and 48 are spaced somewhat from the ends of the flow path 41. The shim 45 is held in place by being clamped between the flat flexible insert 14 and the die cavity insert 15 along the longitudinally extending bar 46 and the depending legs 47 and 48; the lower open end of the shim is thus positioned in the exit gap 13. Shim 45 provides a ready means for adjusting the width of the exit gap 13 for the full length thereof. This is accomplished by replacing one shim with another of a different thickness.

In the construction of FIGURES 1 and 3 the die cavity 16 is machined into the die cavity insert 15. An exit gap or slot need not be machined into the die cavity insert 15. The shim 45 between the flat flexible insert 14 and the die cavity insert 15 automatically provides the exit gap. This simplifies the machining of the die cavity insert because the exit land 37 is in the same plane as the sealing and the bearing surfaces 38 and 39. Without shim 45, in the structure of FIGURE 1, it would be necessary to machine a recess into one or the other of the flat insert 14 and the die cavity insert 15 to provide the exit gap. Since it is this land 37 of the exit gap which requires the most careful machining for smoothness, the machining of a recess to provide such land would add greatly to the expense and difficulty of producing same.

The contacting outer edges of the flat flexible insert 14, shim 45 and the die cavity insert 15 are provided with suitable packing or gaskets (not shown) to form tight joints effectively sealing the die cavity 16, flow path 41 and the side edges of the exit gap 13.

The extrusion die of FIGURES 4 and 5 differs from that of FIGURES 1 and 3 chiefly in that it does not involve a shim coresponding to shim 45. In the construction of FIGURES 4 and 5, bearing surface 36' is positioned in a plane spaced somewhat from the plane of the land 37. The distance surface 36' extends from the plane of the land 37 (i.e., in a direction to the left viewing FIGURE 5) is equal to the width of the exit gap, subject, of course, to adjustment of this width by positioning the adjusting wedge 28 in its opening 29 and the adjustment effected of the contour of the exit gap by the adjusting bolts 24.

In FIGURE 5, 51 is a key positioned in aligned openings in supporting blocks 11 and 12 to facilitate registry of these two blocks . A key 52 is positioned in aligned openings at the upper portion of the flat flexible insert 14 and die cavity insert 15 to facilitate proper alignment of these members. 53 is a gasket positioned in a opening running the full length of the die cavity 16, the sides thereof and the communicating flow path 41 to provide a liquid-tight seal for the die cavity, the communicating flow path and the ends of the exit gap. Desirably a pressure equalizing channel 54 is provided in the die cavity insert 15. This channel is positioned just above the exit gap 13, i.e., just above the upper edge of land 37 and extends the full length of the exit gap.

Collar 55 maintains feed pipe 42 in position on supporting block 11.

It will be appreciated that the die is provided with usual channels for heating elements, thermocouple connections, eye bolts or other members to facilitate handling and other such conventional components. In the interest of simplifying the drawings such details have been omitted.

The extrusion die of the present invention is designed for extruding films of plastic under any desired pressure, including pressures of the order of from 1000 to 10,000 p.s.i.g. The film is extruded, i.e., leaves the exit gap at approximately atmospheric pressure.

It will be noted that the present invention provides an extrusion die designed to prevent differential expansion or contraction of the lips of the exit gap. In this invention, the ends of the flat flexible insert 14 and die cavity insert 15 are not restrained; they are free to expand or contract with temperature changes. Hence the exit gap once adjusted remains uniform, i.e., is not distorted due to differential contraction or expansion. Any expansion or contraction which takes place is the same for both members defining the lips of the exit gap because both members are constructed of the same material. Because distortion of the exit gap is substantially reduced, if not completely eliminated, better control of the thickness of the film as achieved.

Moreover, in the structure of this invention only the flexible flat insert 14 and the die cavity insert 15 need be made from corrosion-resisting alloys having machinability, such, for example, as nickel alloys, e.g., "Incolloy," an alloy consisting of about 70% by weight of nickel, 20% chromium and 10% iron. The heavy structural parts 11 and 12 can be made of any desired inexpensive material such, for example, as steel.

The present invention permits the ready adjustment of the flow path 41 by means of the adjustment wedge 28. This adjustment also effects adjustment of the width of the exit gap. The wedge by its screws 34 can be moved so that one end of the wedge is positioned in its opening at a different level than the other or where conditions require, so that the wedge is at the same level throughout its length. The wedge thus permits adjustment of the flow path to compensate for the shape of the flow path, i.e., the wedge can be used to force the sides defining the flow path and exit gap into a shape which gives optimum flow.

Adjustment of the exit gap at localized points along its length is effected by adjustment bolts 24. The latter can be adjusted to control the gap distance at localized points and thus control the transverse profile of the outflowing extrudate.

In the embodiment of FIGURES 1 and 3 a further adjustment of the width of the exit gap is provided by the shim 45, which, as noted, permits quick adjustment of the width of the exit gap by replacement of one shim with another, the ultimate fine adjustment being made by the wedge 28 and bolts 24. Hence this invention permits faster profile adjustment which reduces start-up time and material loss during the start-up period.

The flexible insert 14 and die cavity insert 15 being replaceable, one and the same die can be used to produce different web widths requiring different die cavity conformations.

Since different embodiments of the extrusion die embodying this invention can be made without departing form the scope of this invention, it is intended that all matter contained in the above description or shown in the accompanying drawings shall be interpreted as illustrative and not in a limiting sense.

What is claimed is:

1. An extrusion die for producing film, comprising, in combination, a pair of longitudinally elongated supporting blocks positioned in abutting relation, having an exit gap at one end thereof, a flexible insert in one of said supporting blocks one edge portion of said flexible insert defining one lip of said exit gap, a die cavity insert disposed directly opposite said flexible insert and mounted on the other supporting block, an edge portion of said die cavity insert being disposed opposite the said one lip and defining the other lip of the exit gap, means at the exit gap end of said die for adjusting the position of the flexible insert to thus adjust the exit gap, means at the end of the die opposite the exit gap end, positioned in the area of abutment between the two supporting blocks for adjusting the relative position of the two supporting blocks and thus adjusting the exit gap and clamping means for securing the two supporting blocks in clamping engagement with each other.

2. An extrusion die for producing film, comprising, in combination, a pair of longitudinally elongated supporting blocks in abutting relation, having an exit gap at one end thereof, in the locality of the area of abutment, a removable flexible insert in one of said supporting blocks, one edge portion of said flexible insert defining one lip of said exit gap, a removable die cavity insert disposed directly opposite the flexible insert in the other of said supporting blocks, the edge portion of said die cavity insert disposed opposite said edge portion of said flexible insert defining the other lip of said exit gap, means at the exit gap end of said die for adjusting the position of said one lip relative to the other lip, means at the end of the die opposite the exit gap end positioned in the area of the abutment between the two supporting blocks for adjusting the relatives position of the two supporting blocks and thus adjusting the exit gap and clamping means for securing the two supporting blocks in clamping engagement with each other.

3. An extrusion die as defined in claim 2 in which the means for adjusting the two supporting blocks comprises a wedge member extending substantially the full longitudinal extent of the extrusion die, said wedge member being positioned in an opening between said supporting blocks, said opening being defined by a longitudinally extending side in one supporting block and a second longitudinally extending side in the other supporting block, at least one of said sides being inclined, and means for adjusting the position of said wedge and securing the wedge in adjusted position.

4. An extrusion die as defined in claim 2 having a shim arranged to be clamped between the flexible insert and the die cavity insert to control the relative spacing of these two inserts and thus control the width of the exit gap.

5. An extrusion die as defined in claim 4 in which the die cavity insert is of generally oblong shape, has relatively narrow surfaces defining the margins of the oblong, said surfaces being in substantially the same plane and surrounding the die cavity and the flow path leading therefrom to the land defining one lip of said exit gap, said land being formed by one of said longitudinally extending, relative narrow surfaces, said die cavity being machined into said die cavity surface and being inclined from the median area towards the opposite ends of the die cavity, the inclination being in a downward direction the same as the direction of flow through the flow path in the die and the shim having a longitudinally extending portion adapted to bear against the said longitudinally extending relatively narrow surface opposite said land and the shim having depending portions on the opposite ends of said first mentioned portion adapted to bear against the opposite shorter marginal areas of said oblong surface.

References Cited by the Examiner

UNITED STATES PATENTS

| | | | |
|---|---|---|---|
| 2,727,275 | 12/1955 | Nelson. | |
| 3,000,054 | 9/1961 | Seifried et al. | 18—12 |
| 3,102,302 | 9/1963 | Moore | 18—12 |
| 3,118,179 | 1/1964 | Bonner | 18—12 |
| 3,142,090 | 7/1964 | Hoffman et al. | 18—12 |
| 3,162,896 | 12/1964 | Senbert | 18—12 |

J. SPENCER OVERHOLSER, *Primary Examiner.*